(12) United States Patent
Park et al.

(10) Patent No.: US 8,568,826 B2
(45) Date of Patent: Oct. 29, 2013

(54) METHOD OF BRAZING A COMPONENT, A BRAZED POWER GENERATION SYSTEM COMPONENT, AND A BRAZE

(75) Inventors: Junyoung Park, Greenville, SC (US); Jason Robert Parolini, Greenville, SC (US); Ibrahim Ucok, Greenville, SC (US); Brian Lee Tollison, Greenville, SC (US); Stephen Walcott, Atlanta, GA (US); Jon Conrad Schaeffer, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/278,349

(22) Filed: Oct. 21, 2011

(65) Prior Publication Data
US 2013/0101828 A1 Apr. 25, 2013

(51) Int. Cl.
*B05D 1/12* (2006.01)

(52) U.S. Cl.
CPC ........................................ *B05D 1/12* (2013.01)
USPC ........... 427/180; 427/181; 427/189; 427/190; 427/191; 427/192; 427/193; 427/212; 427/215; 427/216; 427/217

(58) Field of Classification Search
CPC ....................................................... B05D 1/12
USPC ......... 427/180, 181, 189–193, 212, 215, 216, 427/217
See application file for complete search history.

(56) References Cited

U.S. PATENT DOCUMENTS

| 798,332 | A | 8/1905 | Green et al. |
|---|---|---|---|
| 3,006,757 | A | 10/1961 | Hoppin, III |
| 3,442,010 | A | 5/1969 | Albers |
| 3,516,825 | A | 6/1970 | Shashkov et al. |
| 3,589,952 | A | 6/1971 | Burae |
| 5,935,718 | A | 8/1999 | Demo et al. |
| 6,163,959 | A | 12/2000 | Arraitz et al. |
| 6,843,823 | B2 | 1/2005 | Kovacich |
| 7,199,174 | B2 | 4/2007 | Ellison et al. |
| 7,279,229 | B2 | 10/2007 | Budinger et al. |
| 7,416,108 | B2 * | 8/2008 | Philip ........................ 228/248.1 |
| 7,651,023 | B2 | 1/2010 | Huang et al. |
| 7,789,288 | B1 | 9/2010 | Johnson et al. |
| 2010/0330386 | A1 * | 12/2010 | Schmitt et al. ................ 428/546 |

FOREIGN PATENT DOCUMENTS

WO    WO 94/29072 A1 * 12/1994

* cited by examiner

*Primary Examiner* — William Phillip Fletcher, III
(74) *Attorney, Agent, or Firm* — McNees, Wallace & Nurick, LLC

(57) ABSTRACT

A method for brazing a component in a power generation system, the brazed power generation system component, and braze are provided to improve repairing power generation systems. The method includes providing the component having a feature in a surface of the component and coating a particulate material with a filler material to obtain a coated particulate material. The method includes preparing the feature to obtain a treatment area and filling the treatment area in the surface of the component with the coated particulate material. The method includes heating the treatment area and surrounding component to a brazing temperature and applying oxidation protection to the treatment area. After the brazing temperature is obtained, the method includes brazing the treatment area and the screen and cooling the component to obtain a brazed joint.

17 Claims, 5 Drawing Sheets

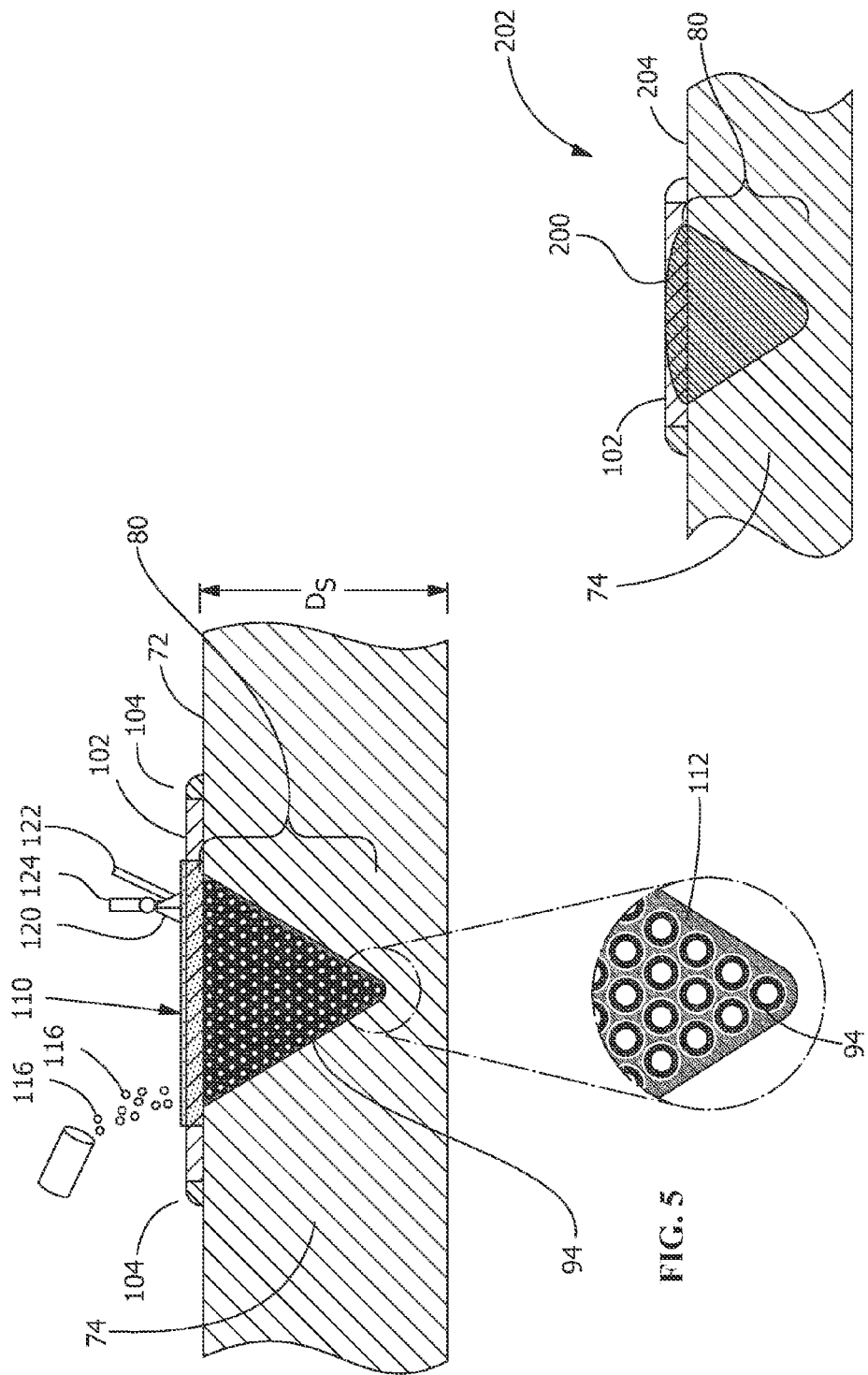

METHOD OF BRAZING A COMPONENT, A BRAZED POWER GENERATION SYSTEM COMPONENT, AND A BRAZE

FIELD OF THE INVENTION

The present invention relates generally to power generation systems and more specifically a method of brazing a component in a power generation system and the resulting brazed component and braze.

BACKGROUND OF THE INVENTION

Turbomachinery components, such as turbine casings, blades or buckets and vanes, are subjected to high temperatures and stresses during operation. Under such conditions, the components may become physically worn, resulting in the formation of cracks, voids and worn surfaces. Welding, brazing, or gap brazing may be used to restore the components to more optimal operating conditions. However, it is difficult to braze some wide gaps and repair components with deep gouges in the surface in the field.

Therefore, an economically viable method of brazing a component in the field, a brazed power system component, and a braze that do not suffer from the above drawbacks is desirable in the art.

SUMMARY OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

According to an exemplary embodiment of the present disclosure, a method of brazing a component is provided. The method includes providing the component having a feature in a surface of the component and coating a particulate material with a filler material to obtain a coated particulate material. The method includes preparing the feature to obtain a treatment area and filling the treatment area in the surface of the component with the coated particulate material. The method includes heating the treatment area and surrounding component to a brazing temperature and applying oxidation protection to the treatment area. After the brazing temperature is obtained, the method includes brazing the treatment area and cooling the component to obtain a brazed joint.

According to another exemplary embodiment of the present disclosure, a brazed power generation system component is provided. The brazed power generation system component includes a coated particulate material applied to a feature in a surface of the power generation system component, an oxidation protection layer applied to the feature and a powder flux applied to the feature during brazing. The coated particulate material includes a particulate material coated with a filler material. Upon heating, the coated particulate material, the oxidation protection layer, and the powder flux are configured to form a braze filling the feature in the surface of the power generation system component.

According to another exemplary embodiment of the present disclosure, a braze is provided. The braze includes a coated particulate material applied to a feature in a surface of a gas turbine component, an oxidation protection layer applied to the feature, and a powder flux applied to the feature during brazing. The coated particulate material includes a particulate material coated with a filler material. Upon heating the coated particulate material, the oxidation protection layer, and the powder flux are configured to fill the feature in the surface of the power generation system component.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 5 is a cross-sectional view of screen and oxidation protection disposed on top of a coated particulate material in treatment area of component of the present disclosure.

FIG. 6 is a cross-sectional view of brazed joint of a component according to the present disclosure.

Wherever possible, the same reference numbers will be used throughout the drawings to represent the same parts.

DETAILED DESCRIPTION OF THE INVENTION

Provided is an economically viable method of brazing a component in the field, a brazed power system component and a braze that do not suffer from the drawbacks in the prior art. One advantage of an embodiment of the present disclosure includes a method for field repairing ductile iron casings having cracks or gouges that developed during operation. Another advantage is a field repair method that allows power generation system components to be repaired to increase service life of the components. Another advantage is a method that allows for repair of large cracks or large gaps in power generation system components.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Power generation systems include, but are not limited to, gas turbines, steam turbines, and other turbine assemblies. In certain applications, power generation systems, including the turbomachinery therein (e.g., turbines, compressors, and pumps) and other machinery may include components that are exposed to heavy wear conditions. For example, certain power generation system components such as blades, casings, rotor wheels, shafts, nozzles, and so forth, may operate in high heat and high revolution environments. As a result of the extreme environmental operating conditions, cracks, gouges, cavities, or gaps may develop on the surface of the components, requiring repair. Some of these gaps may be considered wide gaps or deep gaps due to size of the gap or crack. For example, some gaps may include a gap having a width or length of approximately 3 millimeters or more or a depth of 3 millimeters or more. Large and deep gaps are generally not suitably repaired in the field using traditional welding or brazing methods.

Figure 1:
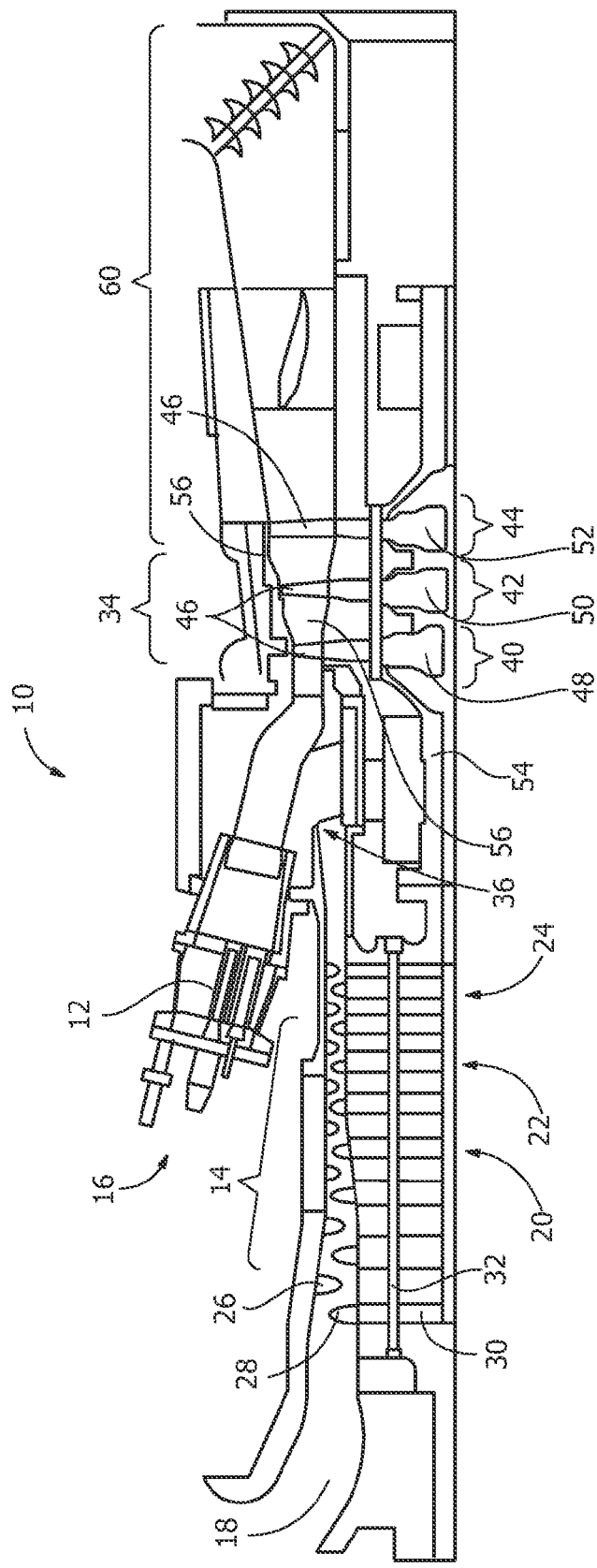
FIG. 1 is a cross-sectional view of a power generation system of the present disclosure.

Turning now to FIG. 1, components of a power generation system 10, depicted in FIG. 1 as a turbine system, may require repair or joining. Mechanical systems, such as power generation system 10, experience mechanical and thermal stresses during operating conditions, which may require periodic repair of certain components. During operation of power generation system 10, a fuel such as natural gas or syngas, may be routed through one or more fuel nozzles 12 into a combustor 16. Air may enter power generation system 10 through an air intake section 18 and may be compressed by a compressor 14. Compressor 14 may include a series of stages 20, 22, and 24 that compress the air. Each stage may include one or more sets of stationary vanes 26 and blades 28. Blades 28 rotate to progressively increase the pressure to provide compressed air and blades 28 may be attached to rotating wheels 30 connected to shaft 32. The compressed discharge air from compressor 14 may exit compressor 14 through a diffuser section 36 and may be directed into combustor 16 to mix with the fuel. In certain embodiments, power generation system 10 may include multiple combustors 16 disposed in an annular arrangement. Each combustor 16 may direct hot combustion gases into a turbine 34.

As depicted in FIG. 1, turbine 34 includes three separate stages 40, 42, and 44 surrounded by a casing 56. Each stage 40, 42, and 44 includes a set of blades or buckets 46 coupled to a respective rotor wheel 48, 50, and 52, which are attached to a shaft 54. As the hot combustion gases cause rotation of turbine blades 46, shaft 54 rotates to drive compressor 14 and any other suitable load, such as an electrical generator. Eventually, power generation system 10 diffuses and exhausts the combustion gases through an exhaust section 60. Power generation system components, such as nozzles 12, intake 18, compressor 14, vanes 26, blades 28, wheels 30, shaft 32, diffuser 36, stages 40, 42, and 44, blades 46, shaft 54, casing 56, and exhaust 60, may use the disclosed methods to repair any cracks, gouges, cavities, or gaps, as described in more detail with respect to FIG. 2 below.

Figure 2:
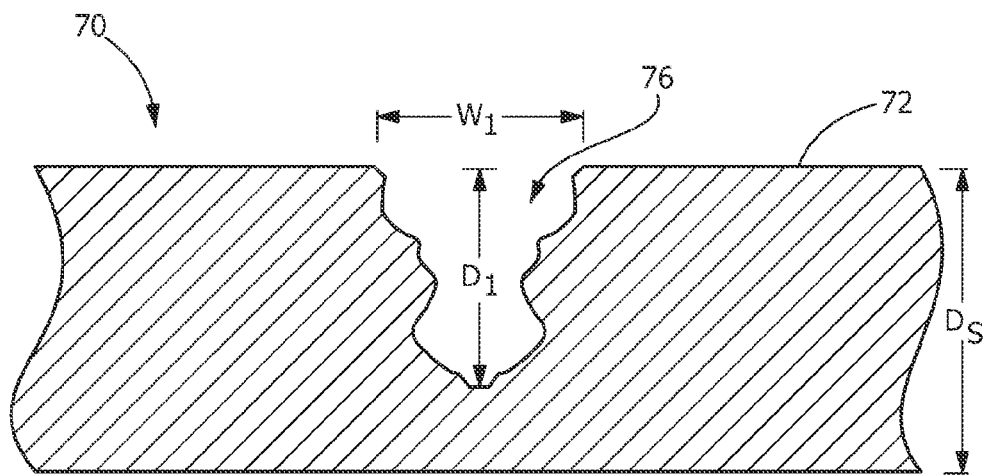
FIG. 2 is a cross-sectional view of a feature in a component of a power generation system of the present disclosure.

FIG. 2. is a cross-sectional view illustrating an embodiment of a component 70 having a surface 72 including a feature 76. Feature 76 includes any cracks, gouges, cavities, or gaps in surface 72 of component 70. Feature 76 may include depth of $D_S$ (e.g. millimeters) from surface 72 of component 70. The component 70 may have a material composition that includes any number of metals, metal alloys, and/or metalized ceramics. For example, if the component 70 is surface 72 of casing 56, the material for component 70 may be a cast iron or any other suitable material for casing 56. The component 70, after exposure to high temperatures and prolonged use or overuse, may develop a feature 76, such as a crack, gouge, cavity, or gap in surface 72 of component 70. As shown in FIG. 2, feature 76 is approximately $W_1$ (e.g. millimeters) long and $D_1$ (e.g. millimeters) deep. $W_1$ and $D_1$ may be of a size that renders other repair techniques, such as arc welding or standard brazing, unsuitable for use. For example, $W_1$ and $D_1$ may be approximately greater than 3 millimeters. In certain cases, $D_1$ is approximately equal to $D_S$. That is, feature 76 may have resulted in a separation of component 70 into two pieces. Traditional welding and brazing techniques cannot always be used to successfully repair damage, such as features 76 in components 70, thus desirable to use brazing method described herein for successful component restoration.

Figure 3:
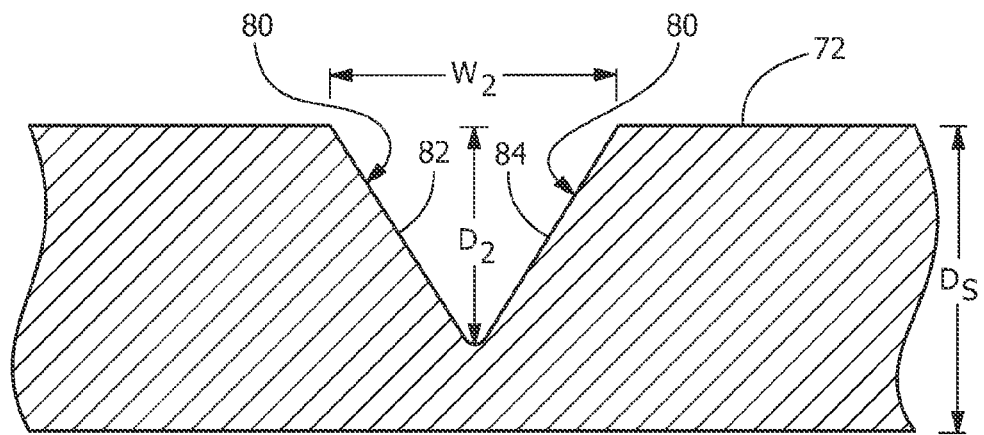
FIG. 3 is a cross-sectional view of a treatment area in a component of the present disclosure.

FIG. 3 is a cross-section view illustrating an embodiment of treatment area 80 constructed by preparing feature 76 of component 70. Preparing feature 76 to obtain treatment area 80 includes nickel plating, Nicroblasting, machining, grinding, cleaning, and combinations thereof. In the illustrated embodiment, edges 82 and 84 of treatment area 80 have been machined by using, for example, an angle grinder, on feature 76 to obtain substantially uniform walls more suitable for the method of brazing. Machining feature 76 to obtain edges 82 and 84 of treatment area 80 also removes any corrosion, oxidation, and other contaminants that may have been present in feature 76 of FIG. 2. Treatment area 80 includes a width $W_2$ and a depth $D_2$ greater than width $W_1$ and depth $D_1$ of feature 76. The larger width $W_2$ and depth $D_2$ results from preparing feature 76 by suitable methods, such as machining, to obtain more uniform edges 82 and 84 for treatment area 80, and from removing any undesirable particulate from component 70. In certain embodiments, the treatment area 80 may be further cleaned by the application of a cleaning solution such as a slightly acidic solution, followed by the application of another cleaning solution designed to stop any acidic reaction. It is to be understood that any other suitable chemical treatments or cleaning solutions may be used. Other cleaning operations may be used, for example, a wire brush or a sandblasting may be used to remove particulate matter prior to the chemical treatment.

Figure 4:
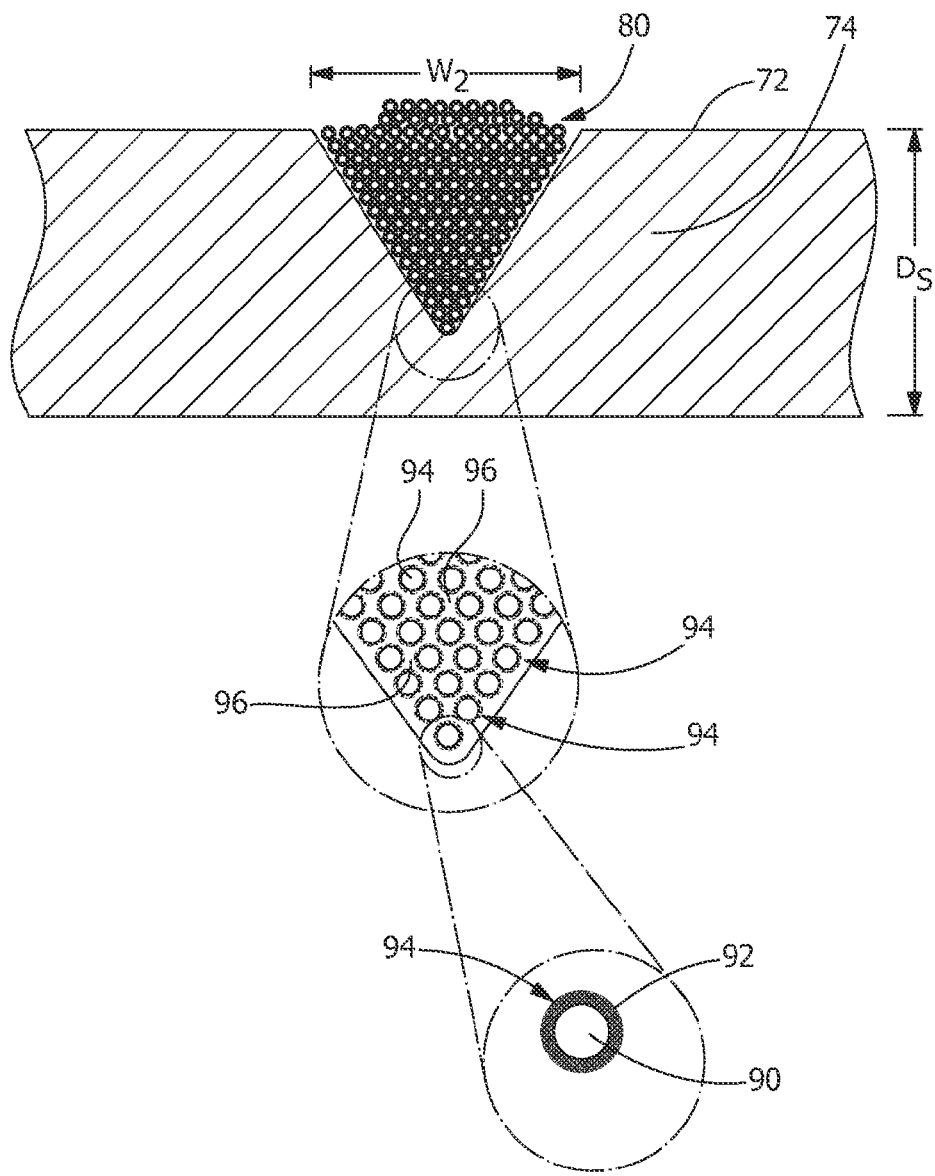
FIG. 4 is a cross-sectional view of coated particulate material disposed in a treatment area of component of the present disclosure.

As shown in FIG. 4, a coated particulate material 94 fills treatment area 80. Coated particulate material 94 is obtained by coating a particulate material 90 with a filler material 92, such that filler material 92 completely surrounds the particulate material 90. In preparing coated particulate material 94, the desired amounts of particulate material 90 and filler material 92 are provided in a container. The container is sealed and subjected to a rigorous mixing or shaking using a rotary tumble mixer. The volume ratio of particulate material 90 to filler material 92 for coated particulate material 94 is approximately 15:1, or alternatively approximately 10:1, or alternatively approximately 8:1 particulate material 90 to filler material 92.

In one example, the material composition for particulate material 90 is chosen based on parent material 74 composition of component 70 and/or the expected service use of component 70. Alternatively, the material composition of particulate material 90 is chosen based on the material's ability to "wet" filler material 92 in component 70, survive the brazing temperature and the service temperature. "Wetting" relates to the ability of particulate material 90 to bond with molten brazing filler metal. Some examples of materials for particulate material 90 include, but not limited to, stainless steel beads, low carbon steel beads, nickel alloy beads, and combinations thereof. In one embodiment, the average diameter of particulate material 90 is approximately 0.254 millimeters (0.010 inches) to approximately 2.032 millimeters (0.080 inches), or alternatively approximately 0.508 millimeters (0.020 inches) to approximately 1.524 millimeters (0.060 inches) or alternatively approximately 0.508 millimeters (0.020 inches) to approximately 1.016 millimeters (0.040 inches). Filler material 92 is selected from powder particles comprising silver. In one embodiment, filler material 92 is selected from powder particles comprising approximately 50-60 weight percent silver, approximately 16-28 weight percent copper, approximately 11-23 weight percent zinc, and approximately 1-8 weight percent tin. Average diameter of powder particles of filler material 92 is approximately 100 mesh (approximately 150 microns) to approximately 400 mesh (approximately 38 microns), or alternatively approximately 170 mesh (approximately 90 microns) to approximately to approximately 325 mesh (approximately 45 microns) or alternatively approximately 200 mesh (approximately 75 microns) to approximately 270 mesh (approximately 53 microns).

As shown in FIG. 4, treatment area 80 is over-filled with coated particulate material 94, such that coated particulate material 94 forms a slight mound in the center of treatment area 80. In one embodiment, coated particulate material 94 is applied to treatment area 80 and smoothed such that coated particulate material 94 is level with surface of component 70. Thereafter, coated particulate material 94 is applied to existing coated particulate material 94 in treatment area 80, such that a small mound forms in center of treatment area 80. Upon heating, coated particulate material 94 undergoes capillary action in treatment area 80, allowing molten coated particulate material 94 to flow more uniformly throughout treatment area 80 thus resulting in a stronger braised joint 200 (see FIG. 6) or repair once coated particulate material 94 cools below its solidus temperature (i.e., temperature at which the materials enter a solid phase).

In one embodiment, as shown in FIGS. 5-6, screen 102 is optionally applied to surface 72 of component 70 over treatment area 80 filled with coated particulate material 94. Screen 102 is attached to surface 72 of component 70 by attachment means 104, for example, but not limited to, tack welding, magnetic means, or other fixturing means.

In one embodiment, as shown in FIG. 5, screen 102 is disposed over treatment area 80. Screen 102, is not necessary for the current method; however, screen 102 includes properties suitable for constraining coated particulate material 94 and oxidation protection 110 inside of treatment area 80, while allowing for outgassing during brazing operations. In one embodiment, screen 102, is selected from, but not limited to, a mesh or a perforated sheet metal capable of being manually shaped or "bent" to the contour of component 70. In another embodiment, screen 102 is a ceramic screen including holes mechanically drilled therethrough or a porosity suitable for enabling the outgassing of brazing gases or vapors, while containing the coated particulate material 94 and oxidation protection 110.

As show in FIG. 5, prior to heating to the brazing temperature, oxidation protection 110 is applied to the treatment area 80. Applying oxidation protection 110 includes applying a liquid flux 112 to treatment area 80 and thereafter applying a paste flux 114 to treatment area 80 prior to heating. Liquid flux 112 is applied in any suitable manner, such as, but not limited to, spraying, coating, or dousing, such that liquid flux 112 penetrates treatment area 80 to fills any gaps or voids 96 (see FIG. 4) in coated particulate material 94 filling treatment area 80.

As depicted in FIG. 5, in embodiments having screen 102, liquid flux 112 penetrates screen 102 to surround coated particulate material 94. Next, paste flux 114 is applied to treatment area 80 or screen 102, if present. Paste flux 114 is applied in any suitable manner, such as but not limited to, spraying or painting. In embodiments, without screen 102 (not shown), paste flux 114 forms a layer over treatment area 80 filled with coated particulate material 94. As shown in FIG. 5, paste flux 114 coats screen 102 and can also infiltrate screen 102 depending on porosity of screen 102.

Liquid flux 112 comprises approximately 25-40 weight percent water, approximately 50-63 weight percent potassium borate, approximately 10-20 weight percent potassium fluoride, approximately 1-3 weight percent boron and approximately 1-3 weight percent boric acid. Paste flux 114 comprises approximately 15-25 weight percent water, approximately 50-75 weight percent potassium borate, approximately 10-20 weight percent potassium fluoride, approximately 1-3 weight percent boron and approximately 1-3 weight percent boric acid.

Next, with or without screen 102 covering treatment area 80, treatment area 80 and component 70 around treatment area 80 are heated using induction coils or other suitable heating operation to a brazing temperature of approximately 537° C. (1000° F. to approximately 982° C. (1800° F.) or alternatively approximately 593° C. (1100° F.) to approximately 871° C. (1600° F.) or alternatively approximately 648° C. (1200° F.) to approximately 760° C. (1400° F.). The area surrounding the treatment area 80 is covered with insulating material to keep the component 70 and treatment area 80 at the desired brazing temperature. In one embodiment, heating with induction coils and surrounding the component with insulation allows the brazing temperature to be reached in under two hours.

As shown in FIG. 5, during heating to brazing temperature a powder flux 116 is applied to treatment area 80. Without being bound by theory, it is believed that during heating to brazing temperature outgassing occurs and powder flux 116 provides additional oxidation protection and replenishes oxidation flux 110 that is outgassed during heating to brazing temperature. Powder flux 116 comprises approximately 75-85 weight percent potassium borate, approximately 15-25 weight percent potassium fluoride, approximately 2-4 weight percent boron and approximately 2-4 weight percent boric acid. Powder flux 116 does not have water content like liquid flux 112 (approximately 25-40 weight percent water) or paste flux 114 (15-25 weight percent water). Applying powder flux 116 to treatment area 80 during heating provides additional oxidation protection to treatment area 80 without reducing the temperature of treatment area 80. Powder flux 116 is obtained by oven drying paste flux 114 in a drying oven at a temperature of approximately 120° C. to approximately 200° C. for approximately 30 minutes to approximately 10 hours to remove all water content depending on the amount of water content in the paste flux.

Once brazing temperature is reached, approximately 537° C. (1000° F. to approximately 982° C. (1800° F.), treatment area 80 is brazed. Brazing includes using a localized heat source, such as a brazing torch 124 or oxy-fuel torch to apply heat and a gas flux 120 to treatment area 80. Brazing torch 124 includes applying a direct flame to the treatment area 80 and includes using any number of fuels, such as, but not limited to acetylene, gasoline, butane, propane, propylene, or a stabilized mixture of methylacetylene (propyne) and propadiene (MAPP) gas to supply heat. As shown in FIG. 5, a flux wire 122 is also applied to treatment area 80 and melted by brazing torch 124. During brazing, powder flux 116 is also applied to treatment area 80. Field brazing of wide gaps or cracks is possible using the present disclosure.

In one embodiment, brazing filler wire 122 comprises approximately 50-60 weight percent silver approximately 16-28 weight percent copper, approximately 11-23 weight percent zinc, and approximately 1-8 weight percent tin. In another embodiment, brazing filler wire 122 is coated with paste flux 114.

During brazing, brazing temperature in conjunction with brazing torch 124 and gas flux 120, melt coated particulate material 94 and surrounding oxidation protection 110. Accordingly, as coated particulate material 94 melts, a capillary-dominated space "pulls" coated particulate material 94 through by a capillary force. The capillary action is beneficial in enabling molten coated particulate material 94 flow more uniformly through the interstices in treatment area 80 to allow the formation of a stronger metallic bond with parent material 74 of component 70.

As shown in FIG. 6, after brazing, component 70 and treatment area 80 are allowed to cool to obtain brazed joint 200 and brazed power generation system component 202. After cooling, optionally, brazed component 202 and brazed joint 200 are finished or machined to remove any additional material from surface 204. Material removed from surface 204 of brazed component 202 include screen 102, if used, and portions of brazed joint 200 that extend from surface 204 of brazed component 202.

Figure 7:
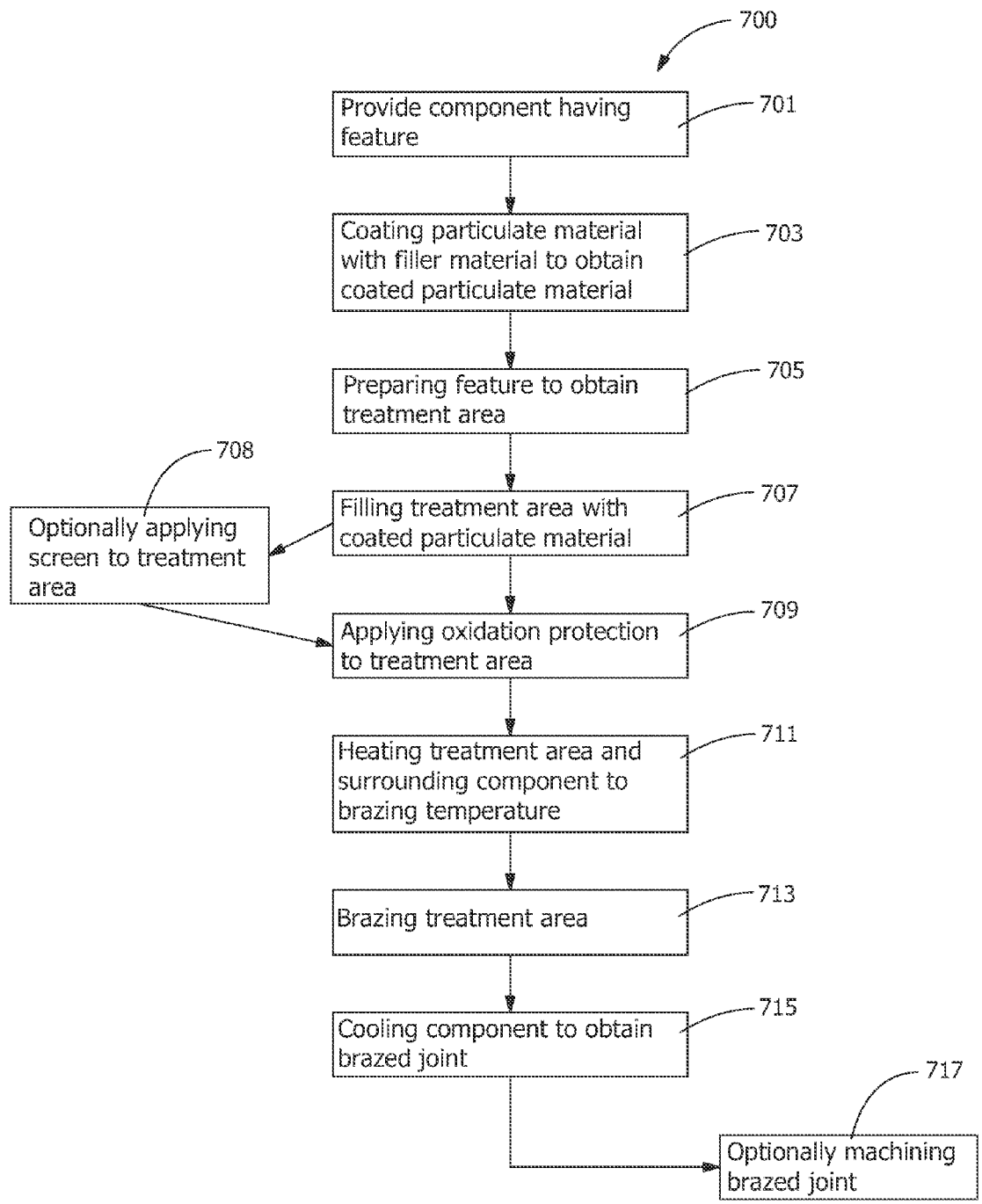
FIG. 7 is a flow chart of method for brazing a treatment area of the present disclosure.

FIG. 7 is a flow chart describing the method of brazing 700 outlined in FIGS. 2-6 above. The method of brazing 700 is suitable for use in field repair applications of large power generation system components, such as, but not limited to casings 56 that are hard to remove and transport for in-shop repair. Method of brazing 700 includes providing component 70 having feature 76 in surface 72 of component 70, step 701 (see FIG. 1). Either in a lab or in the field, particulate material 90 is coated with filler material 92 to obtain coated particulate material 94, step 703. Feature 76 is prepared to obtain treatment area 80, step 705 (see FIG. 3). Preparing, step 705, includes operations, such as, but not limited to, nickel plating, Nicroblasting, grinding, cleaning, and combinations thereof to remove any corrosion, oxidation, and other unwanted material, resulting in treatment area 80. Treatment area 80 is filled with coated particulate material 94, step 707 (see FIG. 4). In one embodiment, treatment area 80 is over-filled with particulate material 94, such that a small mound of coated particulate material 94 is formed above surface 72 of component 70 (see FIG. 4). In an alternative embodiment, while treatment area 80 is being filled with coated particulate material 94, treatment area 80 is being pre-heated to approximately 50° C. to approximately 100° C. Optionally, in one embodiment, screen 102 is applied to treatment area 80 containing particulate material 94, step 708 (see FIG. 5).

Oxidation protection is applied to treatment area 80 containing coated particulate material 94, step 709 (see FIG. 5). Applying oxidation protection, step 709 includes first applying liquid flux 112 to treatment area 80, with or without screen 102 and thereafter, applying paste flux 114 to treatment area 80 (see FIG. 5). Treatment area 80 including coated particulate material 94 covered with oxidation protection 110 and surrounding component are heated to a brazing temperature, step 711. Once brazing temperature is achieved, treatment area 80 is brazed, step 713 (see FIG. 5). Brazing, step 713, includes applying powder flux 116 and using a brazing touch 124 to apply gas flux 120 and flux wire 122 to treatment area 80 to melt coated particulate material 94 (see FIG. 5). After brazing, step 713, component 70 is cooled to obtained brazed joint 200, step 715 (see FIG. 6). Brazed joint 200 joins parent material 74 of component 70 with brazed joint 200 to form brazed component 202. Depending on the service requirements of brazed component 202, brazed joint 200 is optionally machined to remove excess material from surface 204 of brazed component 202, step 717. For example, a grinder may be used to grind off brazed joint 200 and/or screen 102, if present. In other embodiments, no machining is necessary if brazed joint 200 does not interfere with any other component or operations of the repaired power generation system component.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of brazing a component comprising:
   providing the component having a feature in a surface of the component;
   coating a particulate material with a filler material to obtain a coated particulate material;
   preparing the feature to obtain a treatment area;
   filling the treatment area in the surface of the component with the coated particulate material;
   heating the treatment area and surrounding component to a brazing temperature;
   applying oxidation protection to the treatment area;
   after the brazing temperature is obtained, brazing the treatment area; and
   cooling the component to obtain a brazed joint.

2. The method of claim 1, wherein the step of preparing includes nickel plating, nicroblasting, grinding, cleaning, and combinations thereof.

3. The method of claim 1, including an additional step, after the step of cooling, of machining the brazed joint of the component.

4. The method of claim 1, including an additional step, after the step of filling, of attaching a screen to the surface of the component over the treatment area and the coated particulate material.

5. The method of claim 1, including an additional step, during the step of heating, of applying a powder flux to the treatment area.

6. The method of claim 1, including an additional step, during the step of brazing, of adding a gas flux to the treatment area.

7. The method of claim 1, wherein the particulate material includes a plurality of stainless steel beads, low carbon steel beads, nickel alloy bead, and combinations thereof.

8. The method of claim 7, wherein the average diameter of particulate material is approximately 0.02 inches to approximately 0.04 inches.

9. The method of claim 1, wherein the filler material is a particulate comprising silver.

10. The method of claim 1, wherein the step of applying oxidation protection comprises applying a liquid flux to the treatment area and thereafter applying a paste flux to the treatment area prior to heating.

11. The method of claim 10, wherein the liquid flux comprises approximately 25-40 weight percent water, approximately 50-63 weight percent potassium borate, approximately 10-20 weight percent potassium fluoride, approximately 1-3 weight percent boron and approximately 1-3 weight percent boric acid.

12. The method of claim 10, wherein the paste flux comprises approximately 15-25 weight percent water, approximately 50-75 weight percent potassium borate, approximately 10-20 weight percent potassium fluoride, approximately 1-3 weight percent boron and approximately 1-3 weight percent boric acid.

13. The method of claim 5, wherein the powder flux comprises approximately, approximately 75-85 weight percent potassium borate, approximately 15-25 weight percent potassium fluoride, approximately 2-4 weight percent boron and approximately 2-4 weight percent boric acid.

14. The method of claim 6, wherein the gas flux comprises approximately 30-40 weight percent potassium tetraborate, approximately 20-30 weight percent boric acid, approximately 20-30 weight percent potassium bifluoride, approximately 1-5 weight percent potassium pentaborate, approximately 0-0.5 weight percent sodium dodecyl sulfate, and approximately 1-5 weight percent boron.

15. The method of claim 1, wherein the step of brazing the treatment area includes a brazing wire.

16. The method of claim 15, wherein the brazing wire comprises approximately 50-60 weight percent silver approximately 16-28 weight percent copper, approximately 11-23 weight percent zinc, and approximately 1-8 weight percent tin.

17. The method of claim 15, wherein the brazing wire is coated with a paste flux.

\* \* \* \* \*